US008526085B2

(12) United States Patent
Dichtl et al.

(10) Patent No.: US 8,526,085 B2
(45) Date of Patent: Sep. 3, 2013

(54) GRID IMAGE

(75) Inventors: Marius Dichtl, Munich (DE); Thomas Gerhardt, Munich (DE)

(73) Assignee: Giesecke & Devrient GmbH, Munich (DE)

( * ) Notice: Subject to any disclaimer, the term of this patent is extended or adjusted under 35 U.S.C. 154(b) by 669 days.

(21) Appl. No.: 12/673,805

(22) PCT Filed: Aug. 7, 2008

(86) PCT No.: PCT/EP2008/006497
§ 371 (c)(1),
(2), (4) Date: Feb. 17, 2010

(87) PCT Pub. No.: WO2009/024265
PCT Pub. Date: Feb. 26, 2009

(65) Prior Publication Data

US 2011/0069360 A1 Mar. 24, 2011

(30) Foreign Application Priority Data

Aug. 22, 2007 (DE) ........................ 10 2007 039 591

(51) Int. Cl.
*G03H 1/00* (2006.01)

(52) U.S. Cl.
USPC ........................................................ 359/2

(58) Field of Classification Search
USPC ................................................ 359/2, 567
See application file for complete search history.

(56) References Cited

U.S. PATENT DOCUMENTS 4,761,253 A 8/1988 Antes
7,667,894 B2 2/2010 Hoffmuller (Continued)

FOREIGN PATENT DOCUMENTS

DE 103 48 619 A1 5/2005
EP 0 169 326 B1 3/1989

(Continued)

OTHER PUBLICATIONS

International Search Report, International Application No. PCT/EP2008/006497, 3 pages, Nov. 3, 2008.

(Continued)

*Primary Examiner* — Alessandro Amari
(74) *Attorney, Agent, or Firm* — Lathrop & Gage LLP

(57) ABSTRACT

The present invention relates to a grating image (30) for depicting a motif (24) that moves upon tilting the grating image (30) about a tilt axis (20), having two or more grating fields (32, 34, 36) having a viewing-angle-dependent visual appearance, that each include an electromagnetic-radiation-influencing grating pattern composed of a plurality of grating lines, and exhibit a preferred direction that establishes a viewing angle from which the appropriate grating field (32, 34, 36) is visually distinguishable, wherein, according to the present invention, the grating fields (32, 34, 36) are formed from a plurality of sub-regions nested within each other (32-*i*, 34-*i*, 36-*i*), and each grating field (32, 34, 36) displays a motif (24) view (24-A, 24-B, 24-C) that is shifted substantially along the tilt axis (20), wherein the viewing angles for the visual distinguishability and the shifts of the motif views (24-A, 24-B, 24-C) of the grating fields (32, 34, 36) are coordinated with each other such that, upon tilting the grating image (30), a motif (24) depiction that moves substantially along the tilt axis (20) is created for the viewer.

46 Claims, 4 Drawing Sheets

(56) References Cited

U.S. PATENT DOCUMENTS

Figure 1:
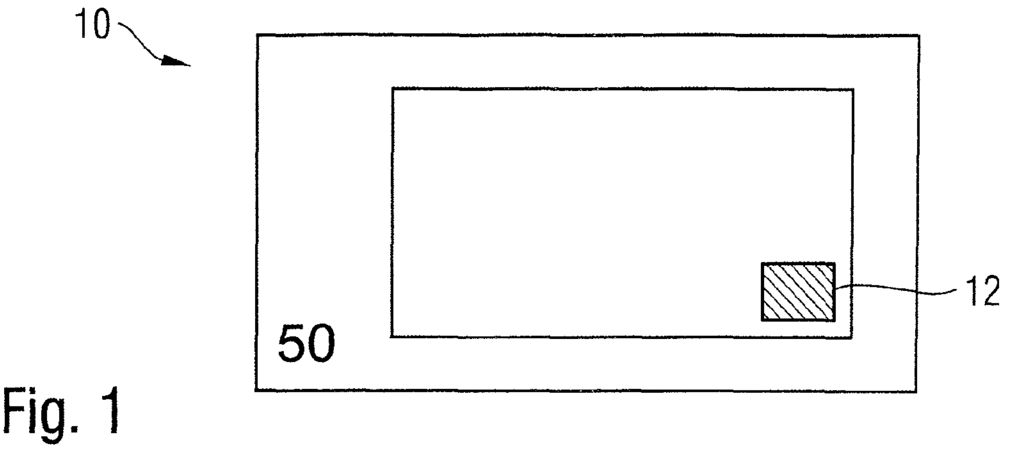

| | | | |
|---|---|---|---|
| 7,719,733 | B2 * | 5/2010 | Schilling et al. .................. 359/2 |
| 7,728,931 | B2 | 6/2010 | Hoffmuller |
| 7,808,605 | B2 | 10/2010 | Hoffmuller |
| 7,986,459 | B2 | 7/2011 | Kaule |
| 8,137,899 | B1 * | 3/2012 | Muller et al. ................. 430/320 |
| 2006/0152807 | A1 | 7/2006 | Kaule |
| 2007/0165182 | A1 | 7/2007 | Hoffmuller |
| 2007/0211238 | A1 | 9/2007 | Hoffmuller |
| 2007/0216518 | A1 | 9/2007 | Hoffmuller |
| 2007/0229928 | A1 | 10/2007 | Hoffmuller |
| 2007/0241551 | A1 | 10/2007 | Heim |
| 2007/0241553 | A1 | 10/2007 | Heim |
| 2007/0246933 | A1 | 10/2007 | Heim |
| 2007/0274559 | A1 | 11/2007 | Depta |
| 2008/0014378 | A1 | 1/2008 | Hoffmuller |
| 2008/0054621 | A1 | 3/2008 | Burchard |
| 2008/0079257 | A1 | 4/2008 | Fessl |
| 2008/0088859 | A1 | 4/2008 | Depta |
| 2008/0160226 | A1 | 7/2008 | Kaule |
| 2008/0163994 | A1 | 7/2008 | Hoppe |
| 2008/0198468 | A1 | 8/2008 | Kaule |
| 2008/0216976 | A1 | 9/2008 | Ruck |
| 2008/0250954 | A1 | 10/2008 | Depta |
| 2008/0258456 | A1 | 10/2008 | Rahm |
| 2009/0001709 | A1 | 1/2009 | Kretschmar |
| 2009/0008923 | A1 | 1/2009 | Kaule |
| 2009/0008926 | A1 | 1/2009 | Depta |
| 2009/0102605 | A1 | 4/2009 | Kaule |
| 2009/0115185 | A1 | 5/2009 | Hoffmuller |
| 2009/0236061 | A1 | 9/2009 | Gruszczynski |
| 2009/0297805 | A1 | 12/2009 | Dichtl |
| 2009/0322071 | A1 | 12/2009 | Dichtl |
| 2010/0175843 | A1 | 7/2010 | Gregarek |
| 2010/0177094 | A1 | 7/2010 | Kaule |
| 2010/0182221 | A1 | 7/2010 | Kaule |
| 2010/0194091 | A1 | 8/2010 | Heim |
| 2010/0194532 | A1 | 8/2010 | Kaule |
| 2010/0196587 | A1 | 8/2010 | Keller |
| 2010/0207376 | A1 | 8/2010 | Heim |
| 2010/0208036 | A1 | 8/2010 | Kaule |

FOREIGN PATENT DOCUMENTS

| | | | |
|---|---|---|---|
| WO | WO 03/106189 | A1 | 12/2003 |
| WO | WO 2005/035800 | A1 | 4/2005 |
| WO | WO 2005/052650 | A2 | 6/2005 |
| WO | WO 2005/069085 | A1 | 7/2005 |
| WO | WO 2005/071444 | A2 | 8/2005 |
| WO | WO 2005/100040 | A1 | 10/2005 |
| WO | WO 2005105473 | | 11/2005 |
| WO | WO 2005105474 | | 11/2005 |
| WO | WO 2005105475 | | 11/2005 |
| WO | WO 2005108106 | | 11/2005 |
| WO | WO 2005108108 | | 11/2005 |
| WO | WO 2005108110 | | 11/2005 |
| WO | WO 2006005434 | | 1/2006 |
| WO | WO 2006015733 | | 2/2006 |
| WO | WO 2006018171 | | 2/2006 |
| WO | WO 2006018172 | | 2/2006 |
| WO | WO 2006040069 | | 4/2006 |
| WO | WO 2006/066731 | A1 | 6/2006 |
| WO | WO 2006056342 | | 6/2006 |
| WO | WO 2006072380 | | 7/2006 |
| WO | WO 2006087138 | | 8/2006 |
| WO | WO 2006099971 | | 9/2006 |
| WO | WO 2006/125224 | A2 | 11/2006 |
| WO | WO 2006119896 | | 11/2006 |
| WO | WO 2006128607 | | 12/2006 |
| WO | WO 2007/006455 | A2 | 1/2007 |
| WO | WO 2007006445 | | 1/2007 |
| WO | WO 2007006455 | | 1/2007 |
| WO | WO 2007076952 | | 7/2007 |
| WO | WO 2007079851 | | 7/2007 |
| WO | WO 2007115648 | | 10/2007 |
| WO | WO 2008/000350 | | 1/2008 |
| WO | WO 2008/000351 | | 1/2008 |
| WO | WO 2008/049533 | | 5/2008 |
| WO | WO 2008/061636 | | 5/2008 |
| WO | WO 2008/071325 | | 6/2008 |
| WO | WO 2009/000527 | | 12/2008 |
| WO | WO 2009/000528 | | 12/2008 |
| WO | WO 2009/000529 | | 12/2008 |
| WO | WO 2009/000530 | | 12/2008 |
| WO | WO 2009/012893 | | 1/2009 |

OTHER PUBLICATIONS

International Preliminary Report on Patentability, International Application No. PCT/EP2008/006497, 12 pages, Aug. 3, 2009, English Translation.

* cited by examiner

GRID IMAGE

CROSS-REFERENCE TO RELATED APPLICATIONS

This application is the U. S. National Stage of International Application No. PCT/EP2008/006497, filed Aug. 7, 2008, which claims the benefit of German Patent Application DE 10 2007 039 591.6, filed Aug. 22, 2007, both of which are hereby incorporated by reference to the extent not inconsistent with the disclosure herewith.

The present invention relates to a grating image for depicting a motif that moves upon tilting the grating image about a tilt axis, and relates especially to such a grating image having two or more grating fields having a viewing-angle-dependent visual appearance, the grating fields each including an electromagnetic-radiation-influencing grating pattern composed of a plurality of grating lines, and exhibiting a preferred direction that establishes a viewing angle from which the appropriate grating field is visually distinguishable. The present invention further relates to a method for manufacturing such a grating image, as well as a security element, a security paper and a data carrier having such a grating image.

Holograms, holographic grating images and other hologram-like diffraction patterns have been in use for several years to ensure the authenticity of credit cards, banknotes and other value documents. In general, in the field of banknotes and security, holographic diffraction patterns are used that can be manufactured by embossing holographically produced grating images in thermoplastically moldable plastics or UV-curing lacquers on foil substrates.

True holograms are created by illuminating an object with coherent laser light and superimposing the laser light scattered by the object with an uninfluenced reference beam in a light-sensitive layer. So-called holographic diffraction gratings are obtained when the superimposed light beams in the light-sensitive layer consist of spatially extended, uniform, coherent wave fields. The action of the superimposed wave fields on the light-sensitive layer, such as a photographic film or a photoresist layer, produces a holographic diffraction grating there that can be preserved, for example, in the form of light and dark lines in a photographic film or in the form of peaks and valleys in a photoresist layer. Since, in this case, the light beams were not scattered by an object, the holographic diffraction grating produces merely an optically variable color impression, but no image representation.

On the basis of holographic diffraction gratings, it is possible to produce holographic grating images by not covering the entire area of the light-sensitive material with a uniform holographic diffraction grating, but rather by using suitable masks to cover, in each case, only portions of the recording area with one of multiple different uniform grating patterns. Such a holographic grating image is thus composed of multiple grating fields having different diffraction grating patterns that normally lie next to one another in a planar, strip-shaped or pixel-like design. With such a holographic grating image, it is possible to depict numerous different image motifs through suitable arrangement of the regions. The diffraction grating patterns can be produced not only through direct or indirect optical superimposition of coherent laser beams, but also by means of electron lithography. Frequently, a sample diffraction pattern is produced that is subsequently translated into a relief pattern. This relief pattern can be used as an embossing die for manufacturing embossed diffraction patterns.

In publication WO 2005/071444 A2, grating fields having grating lines are described that are characterized by the parameters orientation, curvature, spacing and profile, with at least one of these parameters varying across the area of the grating field. If one of the parameters varies randomly, one speaks of so-called matte patterns. Upon viewing, these display no diffractive effects, but rather scattering effects, and exhibit a matte appearance that preferably displays no coloring whatsoever. With pure scattering effects, the matte patterns display the same appearance from all viewing angles.

Based on that, it is the object of the present invention to further improve a grating image of the kind cited above, and especially to create grating images having new optical effects and/or to further increase the counterfeit security of the grating images while preserving the existing advantages.

This object is solved by the grating image having the features of the main claim. A manufacturing method, a security element, a security paper and a data carrier having such a grating image are specified in the coordinated claims. Developments of the present invention are the subject of the dependent claims.

According to the present invention, in a generic grating image, the grating fields are formed from a plurality of subregions nested within each other, and each grating field displays a motif view that is shifted substantially along the tilt axis. Here, the viewing angle for the visual distinguishability and the shifts of the motif views of the grating fields are coordinated with each other in such a way that, upon tilting the grating image, a motif depiction that moves substantially along the tilt axis is created for the viewer.

Such a movement of the motif running along the tilt axis upon tilting the grating image is referred to as an orthoparallactic shift. It contradicts the usual movement behavior in three-dimensional space and thus exhibits a high attention and recognition value.

Parallax shift refers to the apparent change in the position of an object in three-dimensional space upon a change in the position of the viewer. Also in binocular vision, due to the eye separation, different appearances and an apparent shift of the viewed object against a distant background result for the left and the right eye. This parallax shift is all the larger the nearer the viewed object lies and the larger the base line, for example, the eye separation, is. For the effects that occur, it makes no difference whether the position of the viewer is changed in the case of a fixed object position, or whether the position or orientation of the viewed object is changed in the case of a fixed position of the viewer. Only the change in the relative positions of object and viewer is material.

Now, in the case of a relative position change, if the apparent movement direction of an object deviates strongly from the parallax shift common in three-dimensional space, this is called an orthoparallactic shift. In the case of real objects in three-dimensional space, such orthoparallactic shifts do not occur, such that they contradict our perception experiences, in some cases strikingly so.

In the narrower sense, an orthoparallactic shift constitutes a shift perpendicular to the parallax shift. In the context of this description, a shift that deviates strongly from the usual parallax shift is referred to as a "substantially orthoparallactic shift", since also shifts of this kind strongly attract the attention of a viewer to them. In the case of a substantially orthoparallactic shift, the angle between the parallax shift and the movement direction is greater than 45°, preferably greater than 60° and especially greater than 75°.

In addition to the already cited high attention and recognition value, the grating images according to the present invention also exhibit increased counterfeit security, since the described novel movement effects do not permit reproduction, neither by means of the widespread traditional optical direct exposure, nor with the likewise widespread dot-matrix technology.

The viewing-angle-dependent change in the visual appearance of a grating field can consist in a change in the brightness of the grating field or also in that the grating field is visible at certain viewing angles and not visible at other viewing angles.

The grating fields preferably comprise diffractive grating fields that include grating patterns having parallel, equidistant grating lines (so-called linear gratings) that are characterized by a grating constant and an angle orientation and that are visually distinguishable having a colored appearance from the viewing angle established by the preferred direction. Besides linear gratings, the diffractive grating fields can include, for example, subwavelength gratings, moth-eye patterns or the like. The grating patterns of the diffractive grating fields are preferably sinusoidal gratings.

In a likewise advantageous embodiment of the present invention, the grating fields comprise, alternatively or additionally, achromatic grating fields that are visually distinguishable having a matte, preferably silvery appearance from the viewing angle established by the preferred direction.

Through the preferred direction of the grating fields, a viewing angle is established in each case, exhibiting an angular width of about +/−10°, preferably of about +/−5°, particularly preferably of about +/−3°. The smaller the angular width is, the smaller the viewing range is from which the grating field is visually distinguishable.

Advantageously, the grating lines of the achromatic grating fields are characterized by the parameters orientation, curvature, spacing and profile, at least one of these parameters varying randomly, preferably randomly and discontinuously, across the area of the grating field. Here, it can especially be provided that the parameter orientation of the grating lines varies randomly, preferably randomly and discontinuously, in an angle range of less than +/−10°, preferably of less than +/−5°, particularly preferably of less than +/−3°. In a further advantageous embodiment, only the parameter spacing of the grating lines varies randomly across the area of the grating field, while the other characteristic parameters are kept constant.

In the context of the present description, diffraction is understood to be that deviation from the rectilinear propagation of light that is not caused by refraction, reflection or scattering, but rather that occurs when light impinges on obstructions such as slits, diaphragms, edges or the like. Diffraction is a typical wave phenomenon and is thus strongly wavelength-dependent and always associated with interference. It is to be differentiated especially from the processes of reflection and refraction, which can already be accurately described with the image of geometric light beams. When dealing with diffraction at many statistically distributed objects, it has become common to speak of scattering rather than of diffraction at irregularly distributed objects.

Scattering is understood to be the deflection of a portion of a focused electromagnetic wave from its original direction when passing through matter due to the interaction with one or more scattering centers. The radiation diffusely scattered in all directions, or the entirety of the scattering waves emanating from the scattering centers, is lost from the primary radiation. Scattering of light at objects having a magnitude in the range of the light wavelength and below is normally likewise wavelength dependent, such as Rayleigh scattering or Mie scattering. Above an object size exceeding ten times the wavelength, it is commonly referred to as non-selective scattering, in which all wavelengths are influenced approximately equally.

Non-selective scattering can, however, also be achieved with smaller objects if the objects exhibit only an irregular distribution and a suitable spectrum of object sizes, as then the wavelength-dependent properties of the individual objects average out across the entire ensemble. If, as explained in greater detail below, at least one of the characteristic parameters of the grating pattern according to the present invention exhibits a random variation and, at the same time, the grating patterns exhibit a certain degree of order, then both effects that are commonly described with diffraction processes and effects that are commonly described with scattering processes occur simultaneously.

A random variation and a simultaneously existing order can be achieved, for example, in that the random variation of a parameter is restricted to a limited range of values. In this way, the parameter orientation of the grating lines, for example, can randomly vary only in a limited angle range about a marked direction and thus combine a random orientation with the preservation of a preferred direction in the grating pattern.

According to a further possibility, the random variation of one parameter is tied to the constancy of another parameter. For example, in the case of a constant orientation, the spacing of adjacent grating lines can vary randomly such that a specified disorder in the parameter spacing is tied to order in the parameter orientation, and in this way, a preferred direction in the scattering is achieved.

Further details on designing achromatic grating fields having random or random and discontinuous variation of at least one characteristic grating parameter are set forth in publication WO 2005/071444 A2, the disclosure of which is incorporated herein by reference.

The sub-regions of the grating fields are nested within each other and are advantageously developed as narrow strips, especially as strips having a width below the resolution limit of the naked eye. The strip width is preferably between 1 μm and 100 μm, preferably between 1 μm and 50 μm and particularly preferably between 1 μm and 30 μm.

The strips of a grating field advantageously all exhibit the same width. However, it is also conceivable to develop the strips having different widths or even having a width that varies within a strip.

The nesting of the strips of multiple grating fields can be achieved most easily through an alternating sequence of the strips belonging to the different grating fields, in other words, for example, through a strip sequence of the kind ABCABCABC . . . in the case of three grating fields having strip groups A, B and C.

In an alternative embodiment, the sub-regions are developed as small areal elements of arbitrary shape having a size, preferably below the resolution limit of the eye. Here, too, the nesting can be achieved most easily through an alternating arrangement of the areal elements. If, for example, small squares are provided as the areal elements, then lines having the areal element sequence ABABAB . . . can alternate with lines having the offset sequence BABABA . . . Appropriate arrangements are known to the person of skill in the art for other shapes, also.

The motif to be depicted can be developed to be single-level light or dark or, for example to produce a three-dimensional impression, also developed to be multi-level light or dark. The motif preferably comprises a graphic symbol, such as an alphanumeric character string, a logo or abstract geometric shapes. The motif need not be developed as a single uniform motif, but rather can also include multiple motif portions arranged arbitrarily to one another, especially arbitrarily spaced apart.

In an advantageous development of the present invention, the shifted motif views are additionally rotated against each other such that, upon tilting the grating image, a motif depiction that moves substantially along the tilt axis and simultaneously rotates is created for the viewer.

According to another, likewise advantageous development of the present invention, the shifted motif views additionally depict different perspective views of the motif such that, upon tilting the grating image, a motif depiction that moves substantially along the tilt axis and simultaneously changes perspective is created for the viewer.

In a further advantageous development, the shifted motif views are additionally changed stepwise such that, upon tilting the grating image, a motif depiction that moves substantially along the tilt axis and simultaneously changes (morph image) is created for the viewer.

In the case that the motif includes multiple motif portions, it can be provided that the grating fields show views of the motif having different sized shifts of the different motif portions such that, for the viewer, upon tilting the grating image, a moving depiction of the motif is created in which different motif portions move at different speeds along the tilt axis. Here, the movement direction of the motif portions can also be mutually opposing, such that, upon tilting the security element, some motif portions move in a first direction and other motif portions in a second direction opposing the first direction. For example, multiple motif portions can move upward and others downward.

The grating patterns of the achromatic grating fields and/or of the diffractive grating fields are preferably produced electron beam lithographically. This technique facilitates the production of grating images in which each individual grating line can be unambiguously determined by the parameters orientation, curvature, spacing and profile.

It has proven to be expedient when the grating lines exhibit a line profile depth between about 100 nm and about 400 nm. The ratio of line width to grating constant in the achromatic grating fields and/or the diffractive grating fields is advantageously about 1:2. The grating lines in the achromatic grating fields and/or the diffractive grating fields advantageously exhibit a sinusoidal profile. The range of the grating line spacings is preferably between about 0.1 μm and about 10 μm, preferably between 0.5 μm and 1.5 μm. In the case of random variation of the spacings, also very small grating line spacings can, of course, occur in some cases, especially smaller than 0.5 μm.

The grating image itself is preferably coated with a reflective or high-index material. All metals and many metal alloys may be used as reflective materials. Examples of suitable high-index materials include CaS, $CrO_2$, ZnS, $TiO_2$ and $SiO_x$. There is advantageously a significant difference between the refractive index of the medium into which the grating image is introduced and the refractive index of the high-index material. Preferably, the difference in the refractive indices is even larger than 0.5. The grating image can be produced in an embedded or non-embedded embodiment. For embedding, PVC, polyethylene terephthalate (PET), polyester or a UV lacquer layer, for example, are suitable.

The present invention also comprises a method for manufacturing grating images, as well as a security element having a grating image of the kind described above. The security element can especially be a security thread, a label or a transfer element. The present invention further comprises a security paper having such a security element, as well as a data carrier that is furnished with a grating image, a security element or a security paper of the kind described. The data carrier can especially be a banknote, a value document, a passport, a certificate or an identification card. It is understood that the described security elements, security papers or data carriers can be used for securing articles of any kind.

Of course the grating images according to the present invention can be combined with further visual and/or machine-readable security elements. For example, the grating image can be furnished with further functional layers, such as polarizing, phase-shifting, conductive, magnetic or luminescent layers.

In addition to the effects described in connection with the exemplary embodiments, the described grating images facilitate especially the following novel movement effects:

- Orthoparallactic movement of arbitrary motifs, for example of letters, geometric structures and the like, in arbitrary arrangement. In particular, the motifs can exhibit arbitrary spacing to one another, a regular arrangement, for example in the form of a grating, is not required.
- Arbitrary colors can be assigned to the individual motif portions or to the motif.
- Upon tilting, two motif portions can move at different speeds and even in opposite directions.
- In their orthoparallactic movement, the motif portions can additionally rotate about their axis, change their perspective or, in the manner of a morph image, continuously change their form.
- The orthoparallactic movement effect can be provided not only upon tilting about a single axis. It is also possible to provide two tilt axes that are perpendicular to each other with an orthoparallactic movement effect.

Further exemplary embodiments and advantages of the present invention are explained below by reference to the drawings, in which a depiction to scale and proportion was omitted in order to improve their clarity.

Figure 2A:
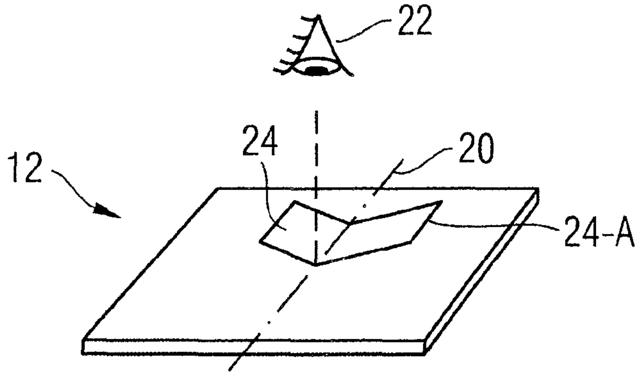
Figure 2B:
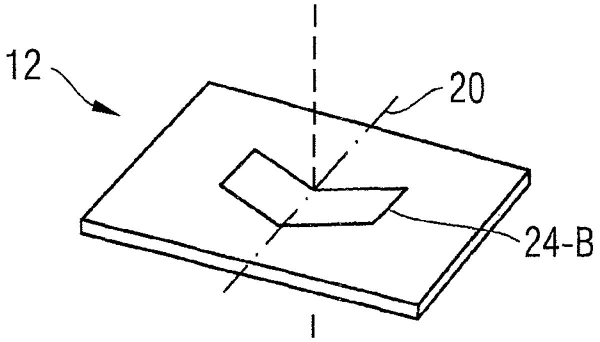
Figure 2C:
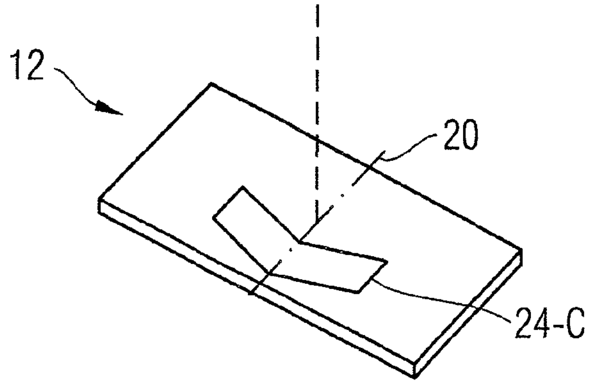
Figure 3:
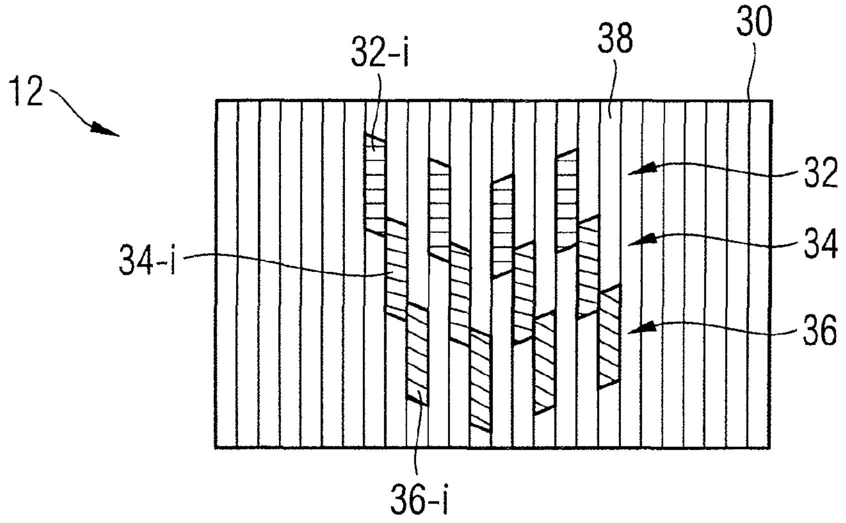
Figure 4A:
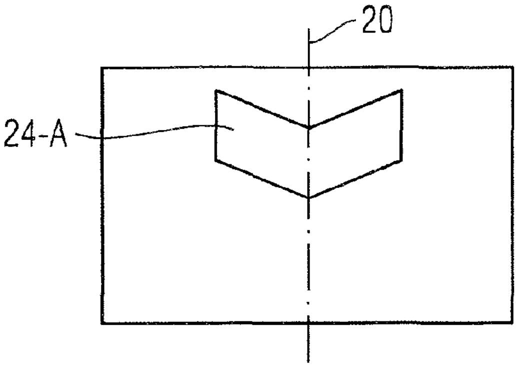
Figure 5A:
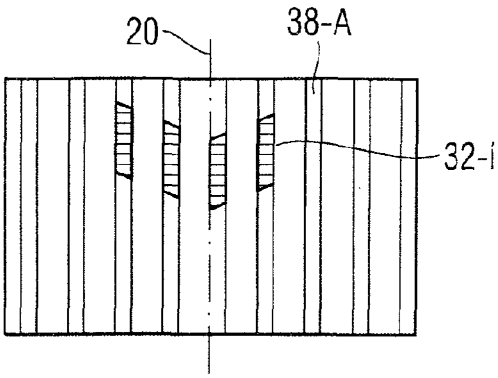
Figure 4B:
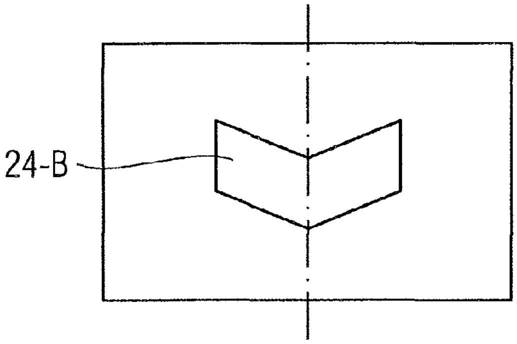
Figure 5B:
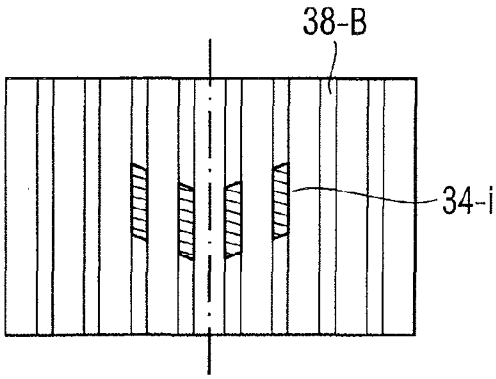
Figure 4C:
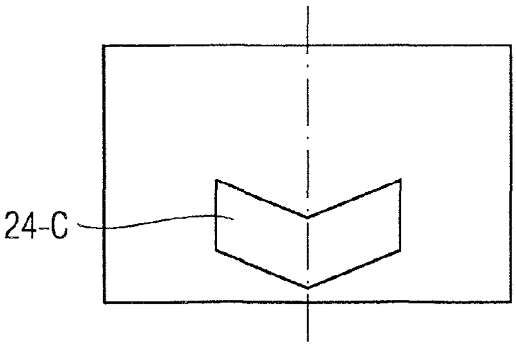
Figure 5C:
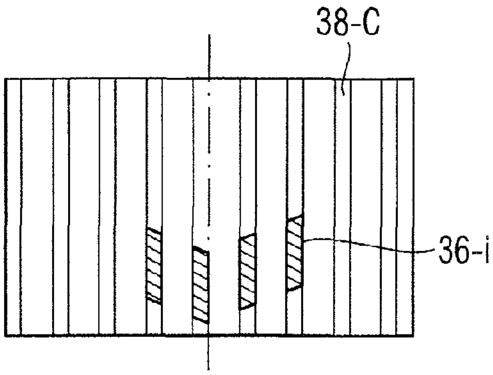
Figure 6A:
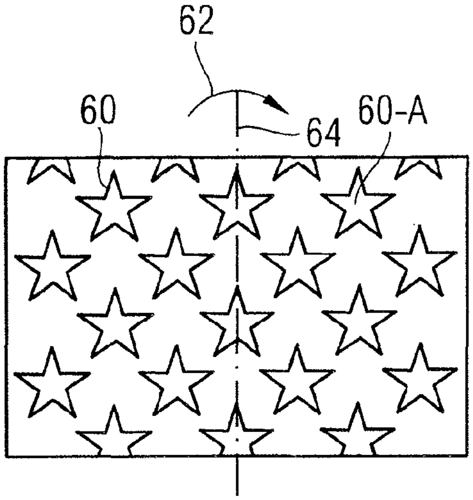
Figure 7A:
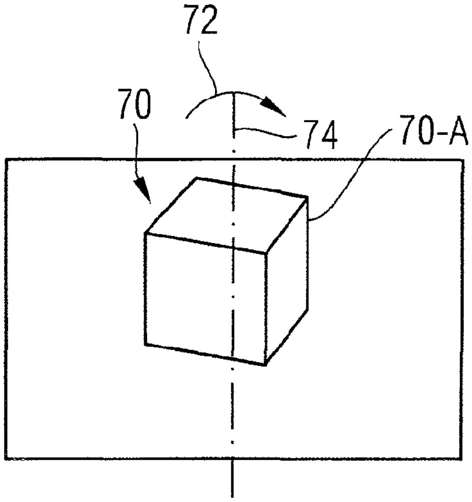
Figure 6B:
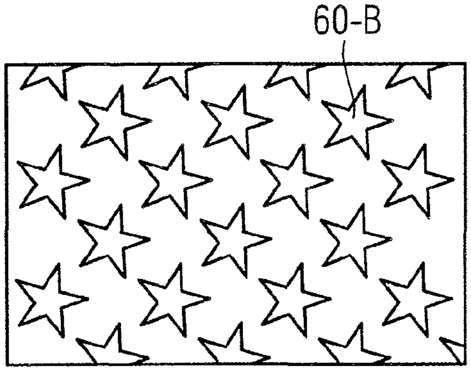
Figure 7B:
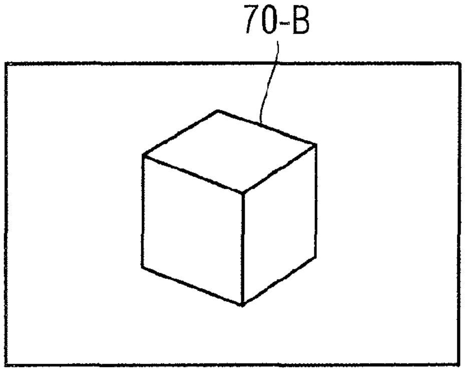
Figure 6C:
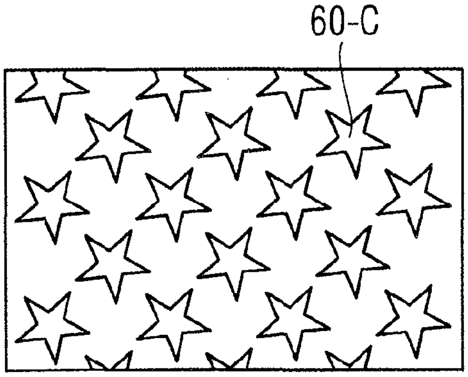
Figure 7C:
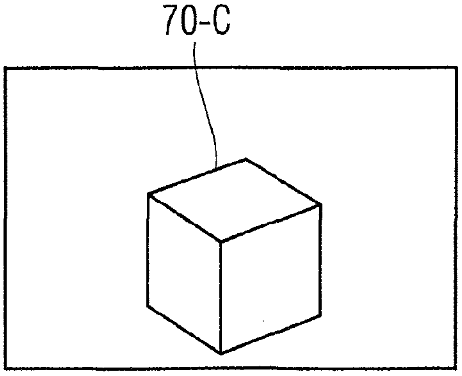

Shown are:

FIG. 1 a schematic diagram of a banknote having a security element according to the present invention, FIG. 2 three views of the security element in FIG. 1, wherein, in (a), a viewer is looking vertically at the untilted security element, in (b), the security element is tilted slightly for the viewer, and in (c), strongly, FIG. 3 schematically, the grating image of the security element in FIG. 2 with its grating fields, FIG. 4 in (a) to (c), the view to be depicted of the motif of the security element in FIG. 2 at three different tilt angles, FIG. 5 in (a) to (c), imaginary intermediate steps in producing the grating image shown in FIG. 3, and FIGS. 6 and 7 two further exemplary embodiments of security elements according to the present invention, wherein, to explain the principle, each of three views at three different tilt angles are shown in (a) to (c).

The invention will now be explained using a banknote as an example. For this, FIG. 1 shows a schematic diagram of a banknote 10 having an inventive security element 12 in the form of an affixed transfer element. The security element 12 includes a grating image having a motif that appears to move upon tilting the grating image.

It is understood that the present invention is not limited to transfer elements and banknotes, but rather can be used anywhere that grating images can be applied, such as in clock dials and costume jewelry, in labels on goods and packaging, in security elements on documents, identity cards, passports, credit cards, health cards, etc. In banknotes and similar documents, besides, for example, transfer elements, also security threads, and besides top view elements, also see-through elements, such as see-through windows, may be used for furnishing with grating images.

The novel movement effect that occurs upon tilting the security element 12 and thus the grating image about a predetermined tilt axis 20 is illustrated in FIG. 2 based on a simple motif in the form of a symmetrical angular piece 24. It is understood that, instead of the angular piece 24, also any arbitrary other motif element can be used in the grating image according to the present invention.

In the position depicted in FIG. 2(*a*), in which the viewer 22 looks vertically at the untilted security element 12, the viewer 22 perceives the angular piece in a first position 24-A lying at the upper edge of the security element 12.

If the viewer tilts the security element 12 about the tilt axis 20, then for him, the angular piece migrates across a medial position 24-B shown in FIG. 2(*b*) downward along the tilt axis 20, until, at a strong tilt, it takes up the position 24-C depicted in FIG. 2(*c*) at the lower edge of the security element 12. When the security element 12 is tilted back, for the viewer 22, the angular piece 24 migrates upward again accordingly.

As already explained above, this kind of apparent movement of the motif 24 constitutes an orthoparallactic shift that deviates from the usual parallax shift. As a viewer, one expects, upon tilting the security element 12 about the tilt axis 20, a shift of the angular piece 24 perpendicular to the tilt axis due to the changing perspective. Instead, for the viewer, the angular piece 24 moves from top to bottom parallel to the tilt axis 20, as shown in FIGS. 2(*a*) to (*c*). This movement behavior that clearly contradicts perceptual habits is thus noticed immediately, also by laypersons, such that a high attention and recognition value of the security element 12 is ensured.

To produce this orthoparallactic movement effect, the security element 12 includes a grating image 30, depicted in FIG. 3, having a plurality of grating fields 32, 34 and 36, each of which displays a viewing-angle-dependent and colored or non-colored visual appearance. For this, the grating fields 32, 34 and 36 are each provided with an electromagnetic-radiation-influencing grating pattern composed of a plurality of grating lines. The grating patterns each exhibit a preferred direction that establishes a viewing angle from which the appropriate grating field is visually distinguishable. As can be seen from FIG. 3, each of the grating fields 32, 34, 36 is formed from a plurality of sub-regions 32-*i*, 34-*i*, 36-*i* that are nested within each other, with only a few sub-regions being depicted in the figure for the sake of clarity.

In the exemplary embodiment, the grating fields 32, 34, 36 constitute diffractive grating fields having grating patterns, each of which includes parallel grating lines that are characterized by a grating constant and an angle orientation. Here, the angle orientation determines the viewing angle from which the grating field is visually distinguishable, the grating constant establishes the color in which the grating field appears from this viewing angle.

As indicated by the differently inclined hatchings in the filled sub-regions in FIG. 3, the grating patterns of the grating fields 32, 34, 36 have the same grating constant in the exemplary embodiment shown, but exhibit different angle orientations such that the grating fields 32, 34, 36 appear visually from different viewing directions, but always having the same color.

As now explained in greater detail based on FIGS. 4 and 5, each of the grating fields 32, 34, 36 displays a view, of the angular piece 24, that is shifted substantially along the tilt axis. Here, FIGS. 4(*a*), (*b*) and (*c*) each show the view to be depicted of the angular piece 24 at three different tilt angles of the grating image that just correspond to the tilts depicted in FIG. 2(*a*) to (*c*). For the sake of clarity, the grating image in FIGS. 4(*a*) to (*c*) is depicted untilted in each case, in top view.

As depicted in FIG. 2(*a*) and FIG. 4(*a*), the angular piece 24 is to appear, upon viewing the security element 12 vertically from above, in a first position 24-A at the upper edge of the security element 12. In a top view of the slightly tilted security element 12, the angular piece is to appear in a medial position 24-B, as shown in FIG. 2(*b*) and FIG. 4(*b*), and in the case of a strong tilt, the angular piece is to appear in the position 24-C shown in FIG. 2(*c*) and FIG. 4(*c*) at the lower edge of the security element 12.

In FIGS. 5(*a*), (*b*) and (*c*) are depicted imaginary intermediate steps in producing the grating image shown in FIG. 3, each of which shows those sub-regions of the grating fields 32, 34, 36 that, when the security element 12 is viewed from the associated viewing angle, lead to the reconstruction of the views shown in FIGS. 4(*a*), (*b*) and (*c*).

To depict the angular piece 24 in the position 24-A in FIG. 4(*a*), the grating image 30 is broken down into a plurality of narrow strips 38. Here, the width of the strips is less than 100 μm, preferably even less than 30 μm, and is thus below the resolution limit of the human eye. Since, in the exemplary embodiment, three different views of the angular piece 24 are to be depicted, only a third of the strips is used for the reconstruction of the view in FIG. 4(*a*). For this, every third strip 38-A is retained, the other strips discarded.

In the region of the position 24-A of the angular piece, the strip group 38-A is now filled with a grating pattern whose grating constant and angle orientation are chosen in accordance with the desired color and the desired vertical viewing direction. In this way, the grating field 32 shown in FIG. 5(*a*) is created that, with its sub-regions 32-*i*, just reconstructs the view 24-A of the angular piece 24 when viewed vertically.

The calculation of the grating constant and angle orientation can occur, for example, with the aid of the vector formula described in publication WO 2005/038500 A1

$$\vec{n}(\vec{r})\times(\vec{k}'(\vec{r})-\vec{k}(\vec{r}))=m\vec{g}$$

reference being made, for the meaning of the individual variables and details of the application of the vector formula, to WO 2005/038500 A1, the disclosure of which is incorporated herein by reference.

In the same way, to depict the angular piece 24 in the position 24-B in FIG. 4(*b*), a strip group 38-B offset by one strip is selected and these strips filled in the region of the shifted angular piece 24-B with a grating pattern whose grating constant and angle orientation are chosen in accordance with the desired color and the desired slightly tilted viewing direction. In this way, the grating field 34 shown in FIG. 5(*b*) is created that, with its sub-regions 34-*i*, just reconstructs the view 24-B of the angular piece 24 when the slightly tilted security element is viewed.

Further, to depict the angular piece in the position 24-C in FIG. 4(*c*), a strip group 38-C offset by a further strip is selected and filled in the region of the further shifted angular piece 24-C with a grating pattern whose grating constant and angle orientation are chosen in accordance with the desired color and the desired strongly tilted viewing direction. In this way, the grating field 36 shown in FIG. 5(*c*) is created that, with its sub-regions 36-*i*, just reconstructs the view 24-C of the angular piece 24 when the strongly tilted security element is viewed.

As already mentioned, the width of the strips 38 in the embodiment shown in FIG. 3 and FIG. 5 is below the resolution capability of the human eye. In reality, the offset, shown schematically in FIG. 5, of the strips 38-B and 38-C in relation to the strips 38-A in a direction perpendicular to the tilt axis (that is, to the right) is so small that it cannot be perceived by the viewer. Rather, the viewer perceives merely the movement of the angular piece 24 along the tilt axis 20, as shown in FIG. 4.

Finally, the grating fields 32, 34, 36 in FIGS. 5(*a*) to (*c*) are combined with each other to produce the complete grating image 30 depicted in FIG. 3. It is understood that, in practice, normally more than three strip groups are chosen to achieve a soft or even continuous-appearing transition of the different motif views upon tilting.

Instead of or in addition to the diffractive grating fields, the grating image can also include achromatic grating fields that likewise display a viewing-angle-dependent, but non-colored, and instead silvery-matte, appearance. The grating lines of such achromatic grating fields are characterized by the parameters orientation, curvature, spacing and profile, at least one of these parameters varying randomly, especially randomly and discontinuously, across the area of the grating field.

In order to produce, in such an achromatic grating field, a preferred direction that establishes a viewing range, only the parameter spacing of the grating lines, for example, is arbitrarily varied randomly across the area of the grating field and the other characteristic parameters are kept constant. Such an arbitrarily random spacing can be obtained, for example, by consecutive exposure of multiple gratings of identical orientation, but different grating constants. The disorder systematically introduced in this way produces an achromatically scattering grating pattern having a silvery matte appearance. At the same time, due to the parallel grating lines, the grating pattern exhibits a preferred direction for the scattering and, in this way, leads overall to a viewing-angle-dependent, non-colored, visual appearance.

FIGS. 6 and 7 show two further exemplary embodiments of grating images according to the present invention. Here, too, to explain the principle, only three views at three different tilt angles are shown in each case.

FIG. 6 shows, in (a) to (c), three views of a motif 60 that consists of a plurality of silvery matte stars that move orthoparallactically along the tilt axis 64 upon tilting 62 the security element about a tilt axis 64. In addition to the orthoparallactic shift, the stars 60-B and 60-C in the views in FIG. 6(*b*) and (*c*) are rotated about their axis with respect to the starting motif 60-A in FIG. 6(*a*). Thus, for the viewer, the stars appear to migrate and simultaneously rotate about their own axis upon tilting the grating image along the tilt axis 64.

The subdivision of the grating image into grating fields and nested sub-regions, and also the filling of the sub-regions with grating patterns can occur in the manner described above in connection with FIGS. 3 to 5. However, to lend the stars a silvery matte appearance, the sub-regions are not filled with parallel, equidistant grating lines, but rather with arbitrarily randomly spaced-apart grating lines, through which, as just explained, achromatic grating fields having a viewing-angle-dependent appearance are created.

On the other hand, it is, in principle, also conceivable to fill individual sub-regions with parallel, equidistant grating lines while the remaining sub-regions exhibit randomly spaced-apart grating lines. The viewer will then perceive, upon tilting the security element, an orthoparallactic shift and, simultaneously, a rotation of the stars about their axis, with those stars that are assigned to the sub-regions filled with parallel, equidistant grating lines reconstructing in a certain color at a certain tilt angle (viewing angle). In this way, upon tilting, the viewer perceives, in addition to the inventive shift and rotation, also a "lighting up" of individual stars from the plurality of stars having a silvery matte appearance. Such an embodiment has a high recognition value and is particularly counterfeit-proof.

In the exemplary embodiment in FIG. 7, in (a) to (c), three perspective views of a three-dimensional motif 70, here a cube, are shown. Upon tilting 72 the security element about a tilt axis 74, the cube moves orthoparallactically downward along the tilt axis 74. In addition, the views 70-B and 70-C in FIG. 7(*b*) or FIG. 7(*c*), compared with the starting motif 70-A in FIG. 7(*a*), show different perspective views of the cube. Upon tilting the grating image along the tilt axis 74, the cube thus appears for the viewer not only to migrate downward or upward, but rather it appears to simultaneously spatially rotate about its own axis.

The invention claim is:

1. A grating image for depicting a motif that moves upon tilting the grating image about a tilt axis, having two or more grating fields having a viewing-angle-dependent visual appearance, that each include an electromagnetic-radiation-influencing grating pattern composed of a plurality of grating lines, and exhibit a preferred direction that establishes a viewing angle from which the appropriate grating field is visually distinguishable characterized in that the grating fields are formed from a plurality of sub-regions nested within each other, and each grating field shows a motif view that is shifted substantially along the tilt axis, wherein the viewing angles for the visual distinguishability and the shifts of the motif views of the grating fields are coordinated with each other such that, upon tilting the grating image, a motif depiction that moves substantially along the tilt axis is created for the viewer.

2. The grating image according to claim 1, characterized in that the grating fields comprise diffractive grating fields that include grating patterns having parallel, equidistant grating lines that are characterized by a grating constant and an angle orientation and that are visually distinguishable having a colored appearance from the viewing angle established by the preferred direction.

3. The grating image according to claim 1, characterized in that the grating fields comprise achromatic grating fields that are visually distinguishable having a matte appearance from the viewing angle established by the preferred direction.

4. The grating image according to claim 3, characterized in that the grating lines of the achromatic grating fields are characterized by the parameters orientation, curvature, spacing and profile, at least one of these parameters varying randomly, across the area of the grating field.

5. The grating image according to claim 4, characterized in that the parameter orientation of the grating lines varies randomly, in an angle range of less than +/−10°.

6. The grating image according to claim 4, characterized in that only the parameter spacing of the grating lines varies randomly across the area of the grating field.

7. the grating image according to claim 4, characterized in that the parameter orientation of the grating lines varies randomly in an angle range of less than +/−5°.

8. The grating image according to claim 4, characterized in that the parameter orientation of the grating lines varies randomly in an angle range of less than +/−3°.

9. The grating image according to claim 4, characterized in that the parameter orientation of the grating lines varies randomly or randomly and discontinuously, in an angle range of less than +/−10°, less than +/−5°, or less than +/−3°.

10. The grating image according to claim 4, characterized in that only the parameter spacing of the grating lines varies randomly and discontinuously, across the area of the grating field.

11. The grating image according to claim 3, characterized in that the grating lines of the achromatic grating fields are characterized by the parameters orientation, curvature, spacing and profile, at least one of these parameters varying randomly and discontinuously, across the area of the grating field.

12. The grating image according to claim 1, characterized in that the viewing angle established by the preferred direction exhibits an angular width of about +/−10°.

13. The grating image according to claim 1, characterized in that the sub-regions are developed as narrow strips.

14. The grating image according to claim 13, characterized in that the strips exhibit a width between 1 μm and 100 μm.

15. The grating image according to claim 13, characterized in that all strips of a grating field exhibit the same width.

16. The grating image according to claim 13, characterized in that the strips exhibit a width between 1 μm and 50 μm.

17. The grating image according to claim 13, characterized in that the strips exhibit a width between 1 μm and 30 μm.

18. The grating image according to claim 1, characterized in that the sub-regions are developed as small areal elements of arbitrary shape.

19. The grating image according to claim 1, characterized in that the motif is developed to be single-level light or dark.

20. The grating image according to claim 1, characterized in that the motif is developed to be multi-level light or dark to produce a three-dimensional impression.

21. The grating image according to claim 1, characterized in that the motif comprises a graphic symbol, such as an alphanumeric character string, a logo or abstract geometric shapes.

22. The grating image according to claim 1, characterized in that the motif includes multiple motif portions that are arranged arbitrarily to one another.

23. The grating image according to claim 1, characterized in that the shifted motif views are additionally rotated against each other such that, upon tilting the grating image, a motif depiction that moves substantially along the tilt axis and simultaneously rotates is created for the viewer.

24. The grating image according to claim 1, characterized in that the shifted motif views additionally depict different perspective views of the motif such that, upon tilting the grating image, a motif depiction that moves substantially along the tilt axis and simultaneously changes perspective is created for the viewer.

25. The grating image according to claim 1, characterized in that the shifted motif views are additionally changed stepwise such that, upon tilting the grating image, a motif depiction that moves substantially along the tilt axis and simultaneously changes is created for the viewer.

26. The grating image according to claim 1, characterized in that the motif includes multiple motif portions, the grating fields showing motif views having different sized shifts of the different motif portions such that, upon tilting the grating image, a moving motif depiction in which different motif portions move at different speeds along the tilt axis is created for the viewer.

27. The grating image according to claim 1, characterized in that the achromatic grating fields and/or the diffractive grating fields are produced electron beam lithographically.

28. The grating image according to claim 1, characterized in that the grating lines of the achromatic grating fields and/or the diffractive grating fields exhibit a line profile depth between about 100 nm and about 400 nm.

29. The grating image according to claim 1, characterized in that the ratio of line width to grating constant is about 1:2 in the achromatic grating fields and/or the diffractive grating fields.

30. The grating image according to claim 1, characterized in that the grating lines exhibit a sinusoidal profile in the achromatic grating fields and/or the diffractive grating fields.

31. The grating image according to claim 1, characterized in that the grating image is coated with a reflective or high-index material.

32. A security element having the grating image according to claim 1.

33. The security element according to claim 32, characterized in that the security element is a security thread, a label or a transfer element.

34. A security paper having the security element according to claim 32.

35. A data carrier having the grating image according to claim 1, a security element having the grating image, or a security paper having the security element.

36. The data carrier according to claim 35, characterized in that the data carrier is a banknote, a value document, a passport, a certificate or an identification card.

37. The use of the grating image according to claim 1, of a security element having the grating image, of a security paper having the security element or a data carrier having the grating image, the security element, or the security paper for securing articles of any kind.

38. The grating image according to claim 1, characterized in that the grating fields comprise achromatic grating fields that are visually distinguishable having a silvery appearance from the viewing angle established by the preferred direction.

39. The grating image according to claim 1, characterized in that the viewing angle established by the preferred direction exhibits an angular width of about +/−5°.

40. The grating image according to claim 1, characterized in that the viewing angle established by the preferred direction exhibits an angular width of about +/−3°.

41. The grating image according to claim 1, characterized in that the sub-regions are developed as narrow strips having a width below the resolution limit of the human eye.

42. The grating image according to claim 1, characterized in that the sub-regions are developed as small areal elements of arbitrary shape having a size below the resolution limit of the eye.

43. The grating image according to claim 1, characterized in that the motif includes multiple motif portions that are arranged arbitrarily spaced apart from one another.

44. A method for manufacturing a grating image for depicting a motif that moves upon tilting the grating image about a tilt axis, in which are produced in a substrate two or more grating fields having a viewing-angle-dependent visual appearance, in which method the grating fields are each filled with an electromagnetic-radiation-influencing grating pattern composed of a plurality of grating lines, the grating fields are produced having a preferred direction that establishes a viewing angle from which the appropriate grating field is visually distinguishable, the grating fields are formed from a plurality of sub-regions nested within each other, each grating field is produced having a motif view that is shifted substantially along the tilt axis, and the viewing angles for the visual distinguishability and the shifts of the motif views of the grating fields are coordinated with each other such that, upon tilting the grating image, a motif depiction that moves substantially along the tilt axis is created for the viewer.

45. The method according to claim 44, characterized in that the grating patterns are produced electron beam lithographically.

46. A security element having the grating image manufactured according to claim 44.

* * * * *